US012066320B2

(12) United States Patent
Polish

(10) Patent No.: US 12,066,320 B2
(45) Date of Patent: *Aug. 20, 2024

(54) CALIBRATION SYSTEM AND METHOD

(71) Applicant: Daedalus Technology Group, Inc., New York, NY (US)

(72) Inventor: Nathaniel Polish, New York, NY (US)

(73) Assignee: Daedalus Technology Group, Inc., New York, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/566,235

(22) Filed: Dec. 30, 2021

(65) Prior Publication Data

US 2022/0120602 A1    Apr. 21, 2022

Related U.S. Application Data

(63) Continuation-in-part of application No. 16/377,120, filed on Apr. 5, 2019, now Pat. No. 11,215,499.

(51) Int. Cl.
*G01G 3/14* (2006.01)
*A01K 29/00* (2006.01)

(52) U.S. Cl.
CPC ............... *G01G 3/14* (2013.01); *A01K 29/00* (2013.01)

(58) Field of Classification Search
CPC .......... G01G 3/14; G01G 23/01; G01G 19/44; A01K 29/00
USPC .......................................................... 177/1
See application file for complete search history.

(56) References Cited

U.S. PATENT DOCUMENTS

| | | | |
|---|---|---|---|
| RE33,836 E | 3/1992 | Resor, III et al. | |
| 7,278,733 B2 | 10/2007 | Olney | |
| 7,738,624 B2 | 6/2010 | Herold et al. | |
| 8,055,053 B2 | 11/2011 | Kwok et al. | |
| 9,188,973 B2 * | 11/2015 | Tenney | H04N 7/181 |
| 9,671,329 B2 | 6/2017 | Hennebelle | |
| 10,783,708 B2 * | 9/2020 | Musuvathy | G06F 30/23 |
| 11,314,240 B2 * | 4/2022 | Bianchi | G06Q 10/0639 |
| 2005/0026689 A1 * | 2/2005 | Marks | G06T 7/73 |
| | | | 463/36 |
| 2005/0068026 A1 | 3/2005 | May et al. | |

(Continued)

OTHER PUBLICATIONS

Horowitz et al., The Art of Electronics, third ed., 2015, Cambridge University Press, New York, NY, 1225 pgs.

*Primary Examiner* — Jacques M Saint Surin
(74) *Attorney, Agent, or Firm* — Patent Law Works LLP

(57) ABSTRACT

An electronic measurement device or electronic scale including an arrangement of multiple low-cost sensors to measure a physical property of an object is disclosed. The electronic measurement device or electronic scale utilizes an accurate and effective calibration method that compensates for the idiosyncrasies of using individual sensors. The electronic measurement device positions a plurality of sensors at predetermined observational locations to provide sensor output signals in response to sensing physical characteristics of the physical property of the object to be measured and combines the different sensor output signals by applying a combined calibration transfer function that represents a calibration function for each of the plurality of sensors to provide a cumulative measurement signal that represents the measurement of the physical property of the object. A centroid of the mass of the object is computed and used to execute different applications.

20 Claims, 10 Drawing Sheets

(56) References Cited

U.S. PATENT DOCUMENTS

2011/0098157 A1 4/2011 Whalen et al.
2014/0033821 A1 2/2014 Sun et al.
2019/0391012 A1 12/2019 Kokota et al.

* cited by examiner

CALIBRATION SYSTEM AND METHOD

CROSS-REFERENCE TO RELATED APPLICATIONS

This application is a continuation-in-part of U.S. patent application Ser. No. 16/377,120, filed Apr. 5, 2019, and titled "Calibration Apparatus and Method," the entirety of which is hereby incorporated by reference.

BACKGROUND

1. Field of the Invention

The present invention relates generally to the field of measurement devices and methods for calibrating them. In particular, the present invention relates to a calibration apparatus, system or device including an arrangement of multiple low-cost sensors to measure a physical property of an object and methods for calibration or measurement using the novel techniques implemented. More particularly, the present invention describes a multi-sensor approach for calibrating and tracking movement of mobile objects.

2. Description of the Related Art

Measurement devices are common in many industries. Electronic measurement devices or scales as they are otherwise known, are usually constructed of several components, electronic or mechanical. Electronic measurement devices or scales typically have a platform, mostly planar, on which the items or objects to be weighed or measured are placed. A platform for this purpose can range in size and shape depending upon the particular application. The shape and size of these types of platforms can vary over a very wide range. For example, at one end of this wide range, there are kitchen scales configured with two-inch diameter platforms used to weigh ingredients or the like. At the other end of this wide range, there are weigh stations located on highways and configured to weigh passing trucks, with platforms that are tens of feet long. As yet another example, some platforms created for measurement scales used at construction-related sites are shaped to hold loose items such as gravel. Yet other platforms created for scales typically used in hospitals are shaped to hold squirming infants.

A platform in an electronic scale is mechanically coupled to some sort of underlying support structure. The purpose of this support structure is largely to support the weight of the platform and the item placed on or within it that is to be weighed. The support structure must support the weight such that there is no binding action over the support structure's range of motion. Finally, the support structure must transfer the weight to the weighing sensor from some well characterized direction relative to gravity. This direction is typically vertical.

The support structure usually transfers the weight from the platform to the sensor through springs. Springs allow the weight to transfer and to apply to the sensor vertically. These springs typically introduce a low frequency resonance into the scale that is experienced as bounciness or bouncy motion. The non-spring components in the support structure should be extremely rigid in the range of weights that the scale is meant to measure. This is desirable to prevent the support structure from becoming damaged under the weight of any load placed on it such that the support structure itself does not introduce non-linear responses to the weight, which can result in inaccurate readings.

Sometimes in instances when an object to be weighed is very large or massive, it may be desirable to transfer the task of determining the weight to several weight sensors. This distribution serves to reduce the load on any one sensor. This also serves to reduce the stress on some elements of the support structure. However, working with multiple weight sensors in the same system can be complex and therefore, introduces significant calibration difficulties.

One complexity with using multiple weight sensors is that it is nearly impossible to couple the weighing platform to the sensors in a way that evenly distributes the weight among the sensors. This is similar to the problem of a four-legged chair placed on a flat floor. Unless the person seated on the chair exercises some care, the weight of the chair is borne by two diagonally opposed legs and the remaining weight is borne by a single one of the remaining legs. In this example, the chair will have a tendency to rock back and forth between the non-weight bearing legs. In the case of a measurement device or scale, this problem manifests in almost all of the weight being sensed by two sensors, with the remaining sensors receiving unstable results. This problem is typically solved in this example by use of very tight springs configured to couple the scale platform to the weight sensors. These springs as well as "flex" in the platform surface introduce resonances that must be dealt with during calibration and weighing.

The weight sensors are typically load cells that use a strain gauge coupled to a Wheatstone bridge to produce a resistance proportional to weight. A load cell is a transducer that is used to create an electrical signal whose magnitude is directly proportional to the force being measured. The load cells are usually fabricated from a block of metal such as steel or aluminum. The cells are set up so that they are supported by a fixed structure by bolts on one end. The weight to be measured is coupled to bolt holes at the other end. Over the range of weights that the cell is designed to work with, the block slightly buckles or deforms under the weight.

The deformation of the load cell is measured by a strain gauge, which is a device that is typically implemented with thin structures of graphite that are bonded to the load cell. As the load cell deforms under either weight or stress, the graphite stretches. When the graphite changes shape, its resistance to electrical current changes and this resistance change can be measured.

Since the resistance changes in the strain gauge are very small, the strain gauge is incorporated into a Wheatstone bridge. The Wheatstone bridge has an excitation voltage applied and a resultant output voltage that is proportionate to the excitation voltage as well as the weight applied to the load cell.

When all of these parts of the apparatus are designed and constructed properly, voltage output from the load cell is linearly related to the weight applied. As demonstrated here, there is complexity in this sort of arrangement. The deforming function of the metal of the load cell must be designed so it is linear, and the response of the strain gauge must be designed to also be linear. Lastly, the power supply for the excitation voltage applied must be stable. Also, it should be recognized that most resistive elements such as the strain gauge as well as the other resistors in the Wheatstone bridge have temperature dependencies.

However, these problems that exist with load cells have long been understood and are well compensated for. The result is inexpensive, rugged, and reasonably reliable electronic scales. These systems typically operate well up to about 1% or one part in 100. Therefore, to weigh an object that is 150 pounds, such systems can expect to provide accurate measurements up to about 1.5 pounds. With extreme care exercised during design and manufacturing, it may be possible to construct these types of systems to accomplish accurate measurements up to one part in 1000 or even one part in 5000.

Conventional scales use a single load cell and some sort of spring-loaded system to transfer the weight to the single load cell. In such systems, the scale system typically has to wait until the spring settles down or damps to a low enough variation before a reliable reading can be taken Eliminating the springs is not a viable option as that can place great stress on the components. Using multiple load cells is one solution. However, the use of multiple load cells introduces the need to balance them so that they all make similar contributions to the total measured weight. Typical state of the art in such balancing is done through adjustment of small resistors in series with the load cells. These resistors are subject to fluctuations from many sources. For example, there is a standard part VKK1-4 from a company called HBM, Inc., that supplies parts for load cell measurements. The VKK1-4 allows the balancing of four load cells using adjustments of small resistors. Determining how to set these resistors is a complex process. Therefore, while the use of multiple load cells can help reduce the need for as many components, in the way of springs, the calibration and balancing problems are difficult.

The support structures that allow for the use of a single load cell on a large-scale panel are deep, complex, mechanical, and difficult to maintain. While it is certainly possible and common to use a single load cell for large loads, the mechanical systems necessary to transfer those loads involve levers that add considerable and often undesirable depth to the existing scale systems. This depth makes such scales difficult to deploy. Also, the pivot points and other moving parts in such systems require regular maintenance to ensure that these systems in use are not distorting the weight being measured.

Many sensors have an almost linear relationship between their signal output and what such sensors are sensing. However, it is common that the exact slope and intercept of the transform function is not well controlled. More expensive sensors are typically be well calibrated and have well controlled characteristics. Inexpensive sensors often demonstrate poorly controlled characteristics.

It is well known and routine to be able to calibrate a single inexpensive sensor. Consider for example a scale. At the time of manufacture, the manufacturing process can include a test that measures sensor outputs at zero weight and at a single known weight. By this test, the exact particular linear transfer function of this particular weight sensor is easily determined. A problem can surface in applications when trying to utilize multiple inexpensive sensors together. One solution in such applications is to try and characterize each of these sensors separately, but that process is complex and involves separating the sensors from each other to individually discover their linear transfer functions. This process can be a time consuming and frustrating exercise.

Applications that involve multiple sensors face problems in field repair. If one of the sensors fails in the field it must be replaced. That task is not simple as multiple sensors must be balanced and calibrated. The replacement sensor should match exactly what it is replacing. Alternatively, such a system can be taken to where it was manufactured to be properly balanced and recalibrated.

It should also be recognized that robotic systems are typically equipped with multiple sensors. Measurements may be used for different robotic applications.

For at least these reasons, there exists a dire need for a new method of calibration and a new type of multi-sensor approach that can be introduced and calibrated in the field with minimal effort and disruption.

SUMMARY OF THE INVENTION

The calibration system and methods in accordance with the present invention introduce a calibration method and a simplified mechanical system of sensors that enables greater precision from sensors than could otherwise be obtained from prior sensing methods and systems. The calibration method in accordance with the present invention uses multi-sensor systems that are much easier to operate than existing sensing systems and are fabricated from lower cost components. In one embodiment, the method and apparatus of the present invention uses multiple load cells with a solution to the problems of balancing the load cells as well as calibrating the load cells with a minimum requirement of test readings. This approach solves multiple problems including making it simpler to use multiple load cells as well as making scales that use fewer mechanical components.

In accordance with one embodiment of the inventive method, the present system allows characterization of multiple linear transfer functions of multiple sensors while they are coupled together in a finished product using a minimum of test measurements or operations. In operation, the method and device of the present invention provides N+2 readings where N is the number of sensors to be characterized.

Any system or apparatus involving coupled, linearly responsive sensors that must be characterized may be calibrated in this fashion. This invention makes it much easier and simpler to use inexpensive poorly controlled sensors in a wide variety of systems in the field or otherwise. Examples of such sensors include load cells for measuring weight or force, pressure transducers, and humidity sensors. This system or apparatus and method may be easily used with a hall-effect sensor typically used in the automotive industry. In some embodiments, the system and method of the present invention may be used with a current sensor, a galvanometer, a hall-effect sensor, a magnetometer, a voltage detector, typically used to measure electric current, electric potential, magnetic or radio data. In other embodiments, the system and method of the present invention may be used with a humistor or a seismometer used to gauge the weather, moisture, humidity and other environmental readings. It may also be used for measuring position, angle, displacement, distance, speed or acceleration in capacitive sensing devices, flex sensors, gravimeter, integrated circuit piezoelectric sensors, photoelectric sensors, and piezoelectric accelerometers. In yet other embodiments, the system and method of the present invention may also be used with a photodetector, a photodiode, and a photoresistor for measuring optical, light, imaging and photon properties. In yet other embodiments, the system or apparatus and method of the present invention may be used for calibrating pressure devices, for example, a piezometer and a pressure sensor. In yet other embodiments, the present invention may be used for calibrating force, density, and level devices, for example, a hydrometer, a force gauge and force sensor, a load cell, a piezoelectric sensor, and a strain gauge. In yet other embodiments, the present invention is used for calibrating thermal, heat, and temperature devices, for example, a thermistor. In yet other embodiments, the present invention is used to calibrate a capacitance sensor.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION OF THE DRAWINGS

Systems and methods for creating and implementing a calibration apparatus and device are described below. While the systems, methods of the present disclosure are described in the context of a particular device architecture, it should be understood that the device and methods described here can be applied to other architectures and organizations of hardware.

Figure 1:
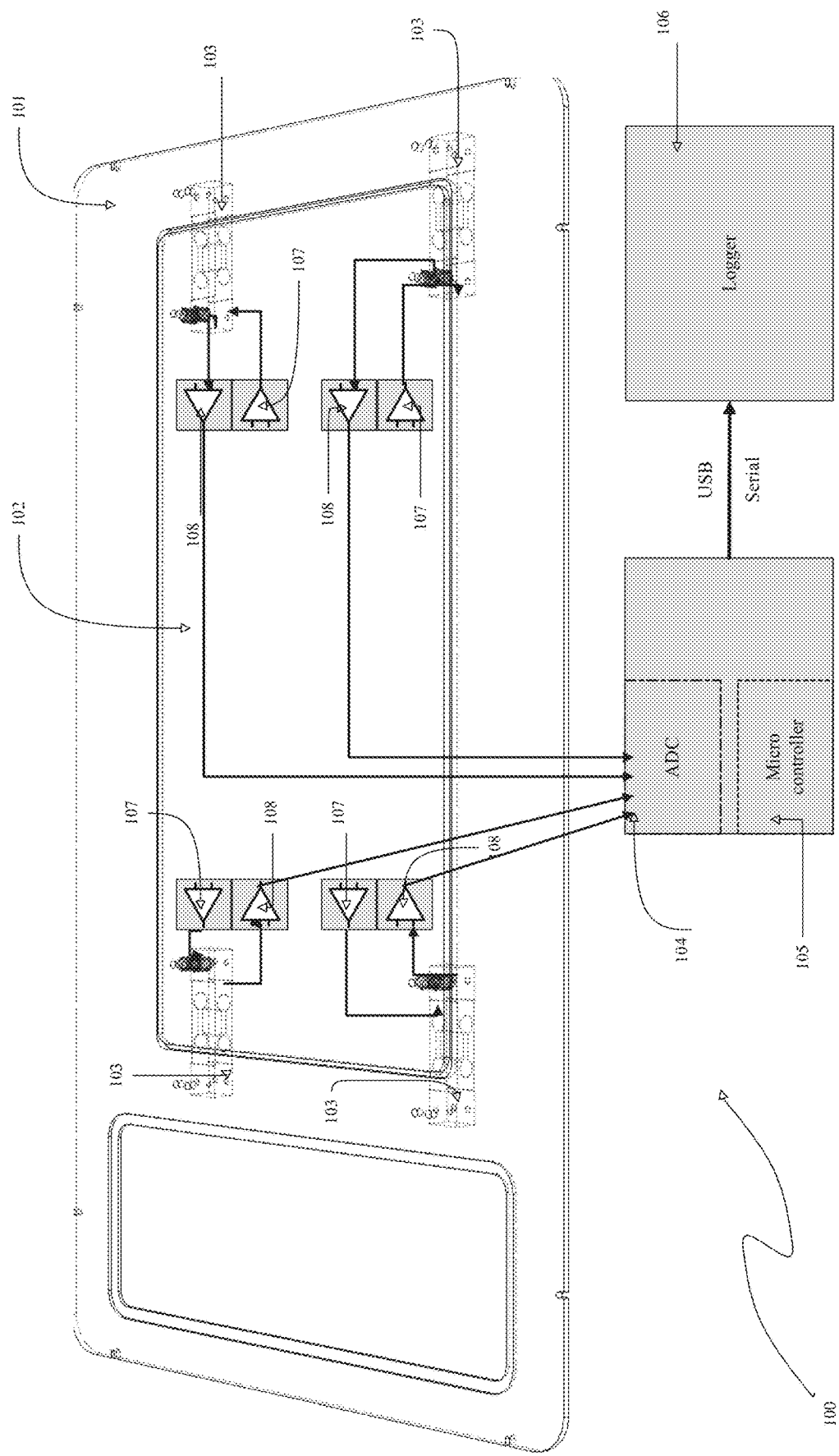
FIG. 1 is a schematic illustration of one embodiment of the calibration apparatus or device in accordance with the present invention.

FIG. 1 illustrates a simplified version of the calibration apparatus or device 100. The calibration apparatus 100 has a non-moving frame 101 and a scale platform 102. The scale platform 102 is configured to receive the object to be weighed. The scaled platform 102 is configured for the object to be either placed onto it or walk onto it. In one embodiment, the scale platform 102 is supported by four load cells, each of which is designated by the reference numeral 103. These load cells 103 are attached rigidly on one side to the non-moving frame 101 and attached on the other side to the scale platform 102. The weight of an object placed on the scale platform 102 is therefore borne by the load cells 103.

In one embodiment, the load cells 103 are strain gauges connected to a Wheatstone bridge. As one example, "The Art of Electronics by Horowitz and Hill," 3$^{rd}$ edition, pages 297 and 298 illustrates such connections. The Wheatstone bridges are supplied excitation voltage using a precision voltage source 107. The sense voltage output from each of the load cells 103 are amplified by instrumentation amplifiers 108 and fed to an analog-to-digital converter (ADC) 104. The output of the ADC 104 is processed by a microcontroller 105. The output of the microcontroller 105 is sent over a conventional USB connection to a datalogging computer 106, referred to as "Logger" in FIG. 1.

In one embodiment, the load cells used may be four inexpensive load cells wired up to a simple multichannel ADC. The calibration method uses a commonly available MAX11254 from Maxim. The system calibrates by weighting a known weight at five locations including the center of the weighing surface. Preferably the four other weighing locations are in the corners as far from each other as possible. Each calibration weighing is used to construct a linear equation of four variables. The center weighing is used as the source of the true weight and thus to provide the sum value of the four equations. The four equations are from the four-corner calibration weighings. This results in four linear equations with four unknowns. The four unknown values are solved for using Gaussian Elimination. This provides the "multiplicative factor" that is applied to each respective load cell.

It is assumed that all of the components of the scale system respond linearly with weight. The signal path from any given load cell consists of at least the following: the scale surface connected to the load cell via a tight and partially compressed spring, the load cell itself which is excited through a stable voltage source, the output signal from the load cell (typically in the tens of millivolt range) is passed through an instrumentation amplifier that applies a several hundred times amplification of the signal, a cable to bring the amplified signal to the ADC, and finally the ADC itself. Note that the voltage source need not be precision only stable and can vary from load cell to load cell. Each of these chains of components need not be matched with each other. All that matters is that the chains of components are linear in their response and consistent over time.

The calibration technique described the system uses an algorithm to compute the zero value or y-intercept of the total linear response curve between the ADC and the scale for each load cell as well as the slope of the linear response curve. Given these two values for each load cell, the algorithm computes the contribution from each load cell to compute the total weight on the scale platform.

It should be recognized that no real-world sensors are perfectly linear. In many cases the sensors can be assumed to be or modeled to be linear if the deviations from linear are small enough to not be significant. This may be varied depending upon the application. In many applications, for example, the noise generated in the system offers a greater contribution to creating an error than the non-linearity of the sensor. However, there are circumstances where the non-linearity is significant. There are can also be hysteresis in the sensor.

In these instances where non-linearity is a significant source of error, the method disclosed herein can be used multiple times at different points along the sensor response curve. For example, the method of the present invention can obtain calibration constants for load cells at 1.000 kg, 5.000 kg, and 10.000 kg in order to map out the response curves across the range of interest. Similarly, in the instance that hysteresis occurs, by this method, the curve may be mapped only in the increasing direction and then again may be mapped only in the decreasing direction. This method may be effectively used as long as a linearity assumption can be made for a small section of the response curve.

Instead of load cells for measuring weight or force, the calibration apparatus or device 100 may alternatively be configured with other examples of sensors such as pressure transducers and humidity sensors. A pressure transducer or pressure transducer is a device that measures the pressure of a fluid, to indicate the force the fluid is exerting on surfaces it is in contact with. Pressure transducers or pressure transmitters convert pressure into an analog electrical signal are used in many control and monitoring applications such as flow, air speed, level, pump systems or altitude. A humidity sensor (or hygrometer) senses, measures and reports both moisture and air temperature. Relative humidity becomes an important factor, when seeking comfort. Humidity sensors work by detecting changes that alter electrical currents or temperature in the air.

The calibration apparatus or device 100 may be easily used with a hall-effect sensor typically used in the automotive industry. A hall effect sensor is a device used to measure the magnitude of a magnetic field. Its output voltage is directly proportional to the magnetic field strength through it. Such sensors are used for proximity sensing, positioning, speed detection, and current sensing applications.

In some embodiments, the calibration apparatus or device 100 may be used with a current sensor, a galvanometer, a hall-effect sensor, a magnetometer, a voltage detector, typically used to measure electric current, electric potential, magnetic or radio data. A current sensor is a device that is typically used to detect electric current in a wire. It generates a signal proportional to that current. The generated signal may be analog voltage or current or even a digital output. In other embodiments, the calibration apparatus or device 100 may be used with a humistor or a seismometer used to gauge the weather, moisture, humidity and other environmental readings. A humistor, sometimes referred to as a humidity sensitive resistor or resistive humidity sensor, is a type of variable resistor whose resistance changes with the change in humidity of the surrounding air. The resistance of the humistor depends on the concentration of absorbed water molecules. When the humidity increases, the water molecules absorbed by the humistor increases and the humistor becomes more electrically conductive. As a result, the resistance of the humistor decreases. On the other hand, when the humidity decreases, the water molecules absorbed by the humistor becomes less electrically conductive. As a result, the resistance of the humistor increases. Likewise, the humistor detects and measures the change in humidity. The calibration apparatus or device 100 may also be used for measuring position, angle, displacement, distance, speed or acceleration in capacitive sensing devices, flex sensors, gravimeter (used to measure gravitational acceleration), integrated circuit piezoelectric (IEPE) sensors (used to measure acceleration, force or pressure), photoelectric sensors (equipment used to discover the distance, absence, or presence of an object by using a light transmitter, e.g. infrared, and a photoelectric receiver), and piezoelectric accelerometers (an accelerometer that uses the piezoelectric effect of certain materials to measure dynamic changes in mechanical variables). In yet other embodiments, the calibration apparatus or device 100 may also be used with a photodetector, a photodiode, and a photoresistor for measuring optical, light, imaging and photon properties. In yet other embodiments, the calibration apparatus or device 100 may be used for calibrating pressure devices, for example, a piezometer and a pressure sensor. In yet other embodiments, the calibration apparatus or device 100 may be used for calibrating force, density, and level devices, for example, a hydrometer, a force gauge and force sensor, a load cell (as described here), a piezoelectric sensor, and a strain gauge. In yet other embodiments, the calibration apparatus or device 100 is used for calibrating thermal, heat, and temperature devices, for example, a thermistor. In yet other embodiments, calibration apparatus or device 100 is used to calibrate a capacitance sensor.

Figure 2:
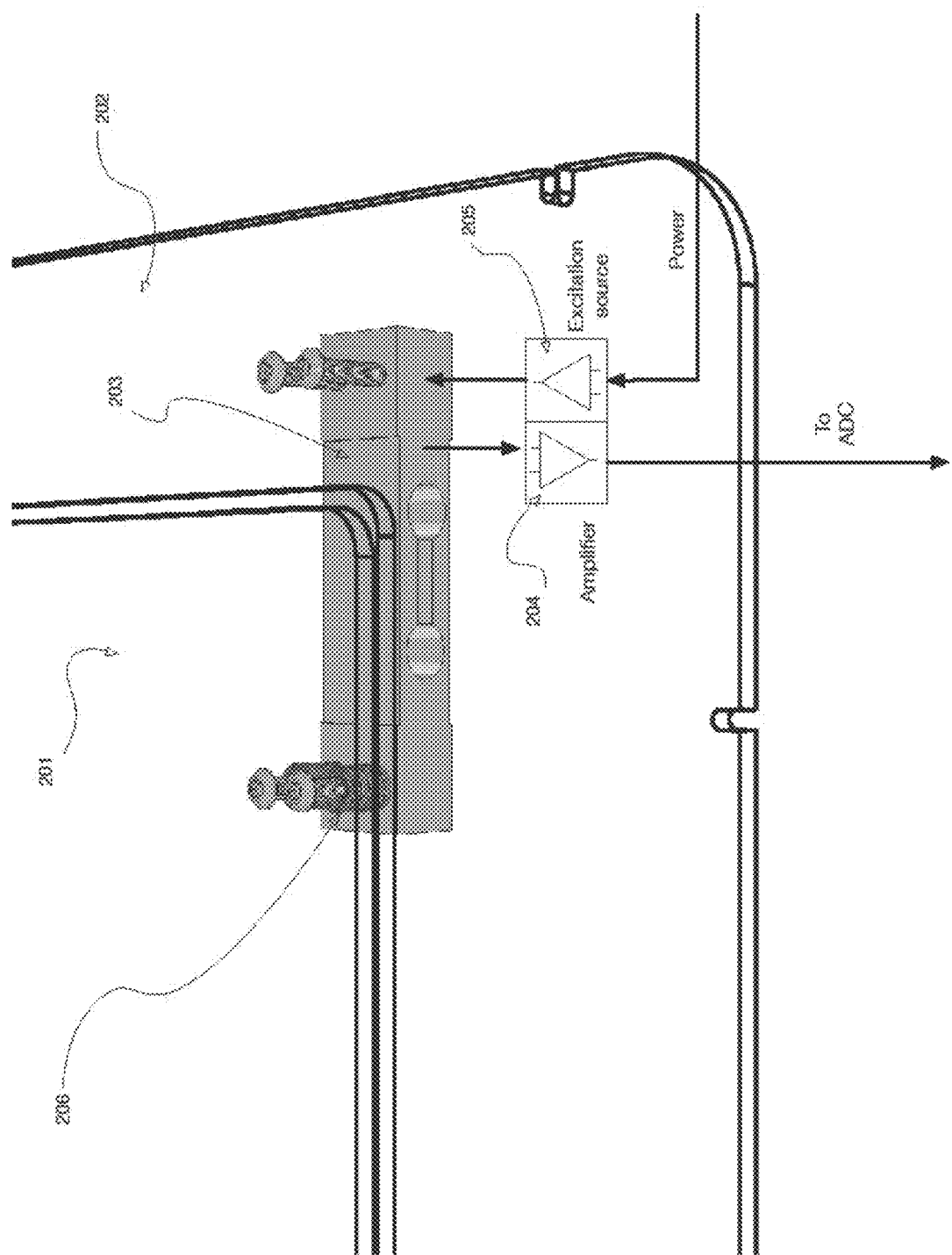
FIG. 2 is a schematic representation illustrating the details of example load cells in one embodiment of the calibration apparatus and device to show how the loads cells are mounted.

Referring now to FIG. 2, more details of each of the load cells 103 are shown, in particular, how they are mounted. FIG. 2 illustrates the fixed frame of the scale 202 as well as the scale platform 201 (102 in FIG. 1). The load cell 203 (103 in FIG. 1) is bolted to the fixed frame 202 by conventional bolts. The other side of the load cells 203 (103 in FIG. 1) is bolted to the scale platform 201 (101 in FIG. 1) using conventional bolts, however, very stiff springs 206 are used to couple the scale platform 201 to each of the load cells 203 (103 in FIG. 1). These springs 206 serve to allow the scale platform 201 (101 in FIG. 1) to float over the multiple load cells and distribute their load.

The excitation power for each of the load cells 203 (103 in FIG. 1) is provided by an excitation source 205 (also seen as 107 in FIG. 1). The signal produced by the load cell 203 is typically approximately a few tens of millivolts. This low voltage is amplified with an instrumentation amplifier 204. Any conventional instrumentation amplifier may be used. For example, there are single package integrated circuits that provide the excitation source as well as the amplification for example from Texas Instruments—the INA125 part that is called "Instrumentation Amplifier with Precision Voltage Reference."

Figure 3:
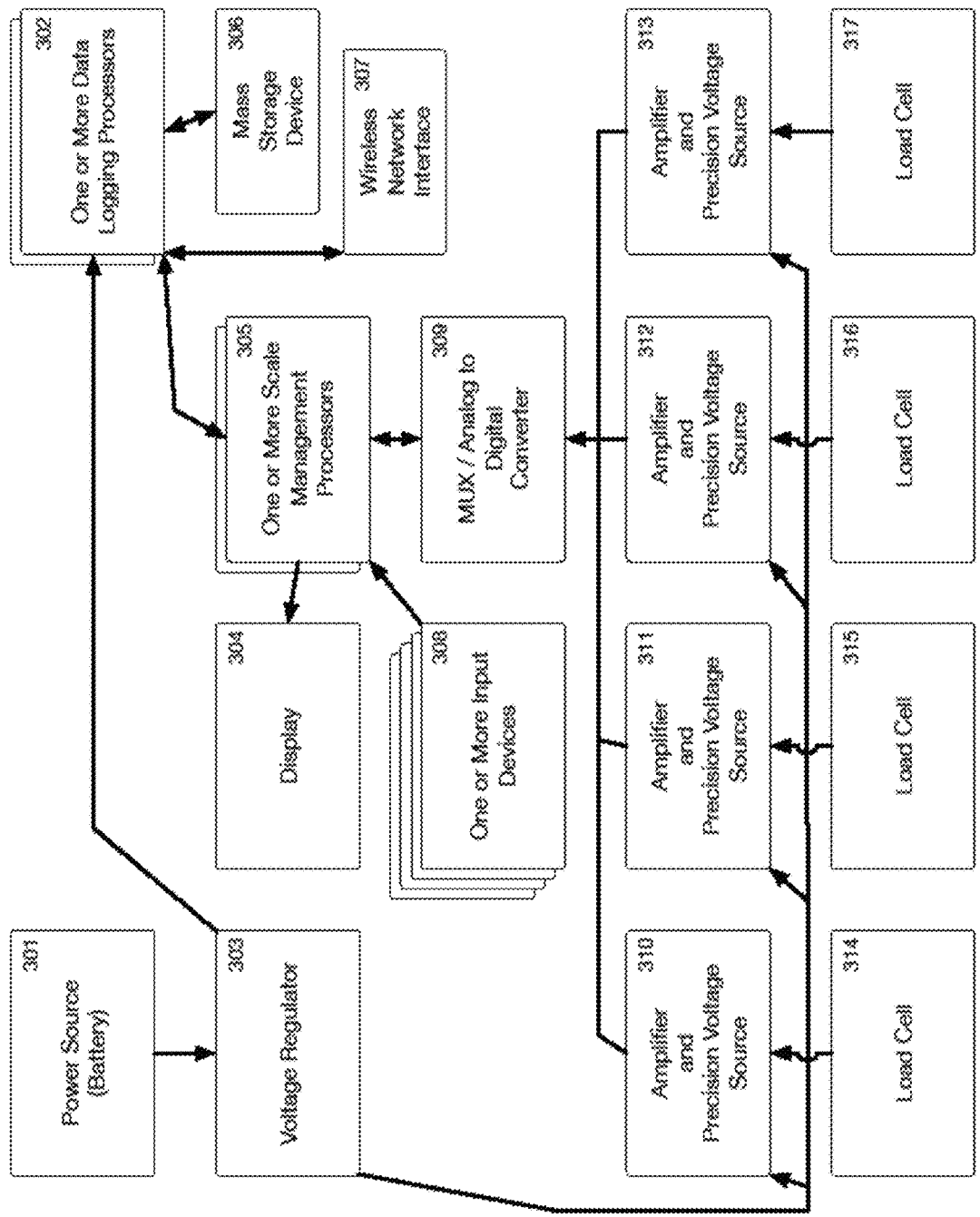
FIG. 3 is a hi-level block diagram illustrating one embodiment of the overall calibration apparatus or device in accordance with the present invention.

Referring now to FIG. 3, a high-level overall block diagram of one embodiment of the calibration apparatus is illustrated. This block diagram shows an example of a scale system, which can be calibrated using the method in this disclosure. The scale is powered by a battery 301, which supplies power to a voltage regulator 303. The voltage regulator 303 in turn provides power to all devices in the scale.

There are four sets of load cells, a first set designated by reference numeral 314, a second set designated by reference numeral 315, a third set designated by reference numeral 316, and a fourth set designated by reference numeral 317. Each of these four sets of load cells are connected to an amplifier and precision voltage source. A first one of the four amplifier and precision voltage sources is designated by reference numeral 310, a second is designated by reference numeral 311, a third is designated by reference numeral 312, and a fourth is designated by reference numeral 313. The output of these sets of amplifier and precision voltage sources 310-313 are sent to an analog-to-digital converter (ADC) 309 (shown 104 in FIG. 1). This ADC 309 is connected to one or more scale-management processors 305. Each of the scale-management processors 305 has control buttons and other input devices designated collectively by reference numeral 308 connected to it. The scale-management processor 305 also has a display 304 connected to it to provide user interface and status information.

The scale-management processor 305 is connected to one or more data logging processors 302 ("Logger" in FIG. 1) that log scale data received into a mass-storage device 306 and communicates results over a wireless network interface 307.

Figure 4:
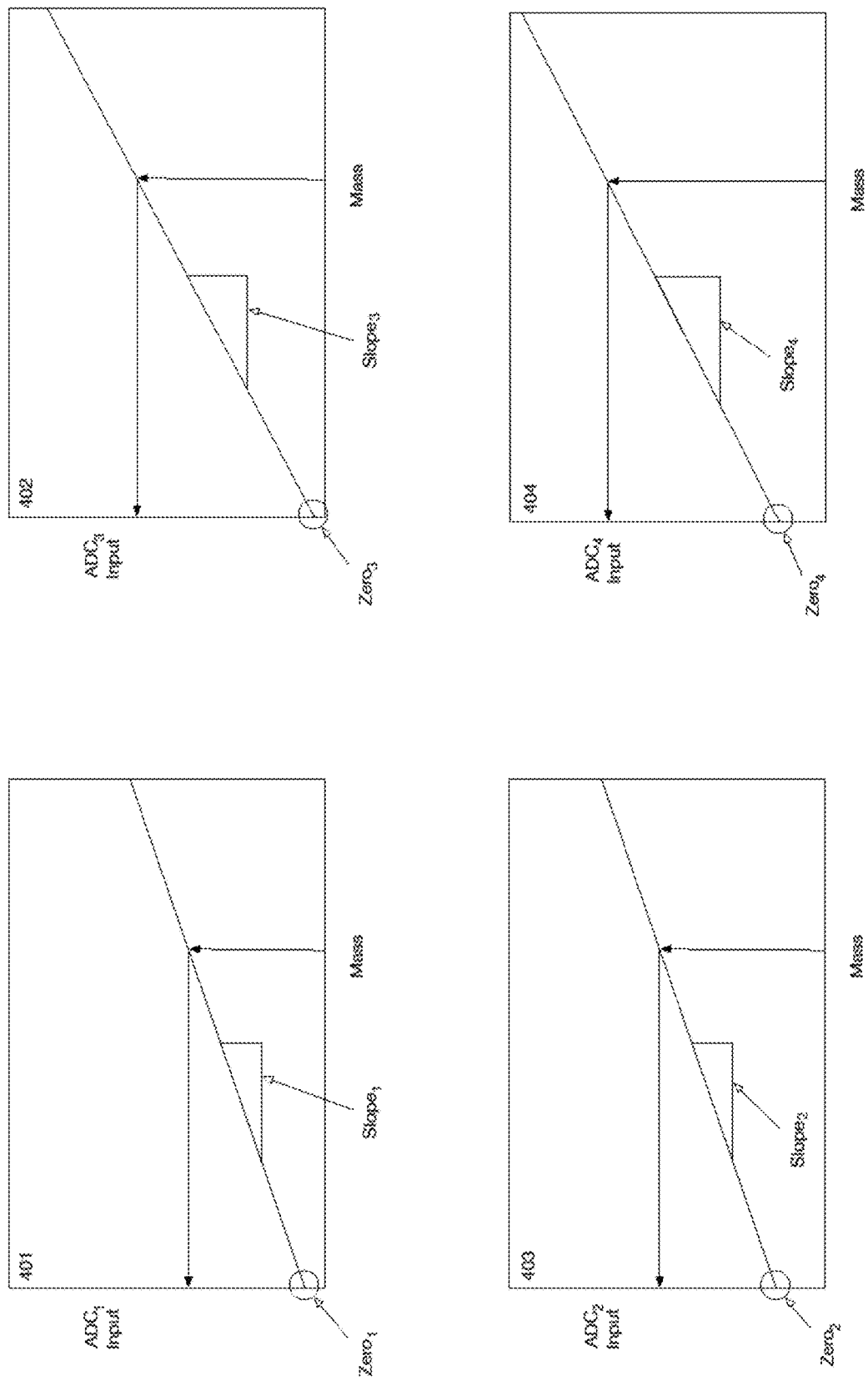
FIG. 4 is a graphical representation illustrating four examples of calibration transfer functions that relate ADC inputs to mass.

FIG. 4 shows four examples of calibration transfer functions that relate ADC inputs to mass. A first example calibration transfer function is designated by reference numeral 401, a second example calibration transfer function is designated by reference numeral 402, a third example calibration transfer function is designated by reference numeral 403 and a fourth example calibration transfer function is designated by reference numeral 404. Each of these example calibration transfer functions are illustrated by a graphical representation including an ADC input, a mass of the object to be weighed, a slope and a zero point.

In operation, for calibration, the varying voltages that are produced by the weight sensor or sensors must be converted into a weight measurement to be output to a user (e.g. via the logger 106 in FIG. 1). An analog-to-digital converter (e.g., ADC 104 in FIG. 1) is usually used to measure the voltages and provide it to a computer (e.g. microcomputer 106 in FIG. 1) for further processing. Given that these types of systems are mostly linear, a theoretical line maps a voltage to a weight. This is the linear response curve. Calibration is a process by which the parameters of the line—slope and y-intercept—are discovered. If everything is working perfectly and all elements are behaving linearly and in the case of the use of a single weight sensor the problem of calibration is simply to take and record two measurements with each of two separate and known weights.

Usually this calibration operation is accomplished with a zero weight when the scale is empty (without a physical object placed on its platform) and with a weight (of a physical object placed on its platform) as close as practical to the full-scale capacity of the scale. The line that passes through these two measurements may be easily computed. All further measurements of output voltage can then be computed based on that line.

One additional wrinkle to consider even in the instance of a perfectly functioning single load-cell design is drift. Drift is due to changes in the characteristics of the system over time. Although the slope of the calibration line does not typically change over time, the y-intercept changes. This creates an additive error to the results. This means that when a scale is first powered up to operate, it must be zeroed. At first power up, it is typical to ask the user to remove everything from the scale so that the zero can be determined. It varies from implementation to implementation but this zero is usually valid only for a few minutes before another zero must be obtained.

Another approach to the zero problem is to simply record the changes in the scale reading from when the physical object is placed off the scale to when it is placed on the scale. When we have used this scale system for tracking the weight of wildlife we consider the scale reading shortly before the animal enters the scale as a way to "zero" the scale.

Figure 5:
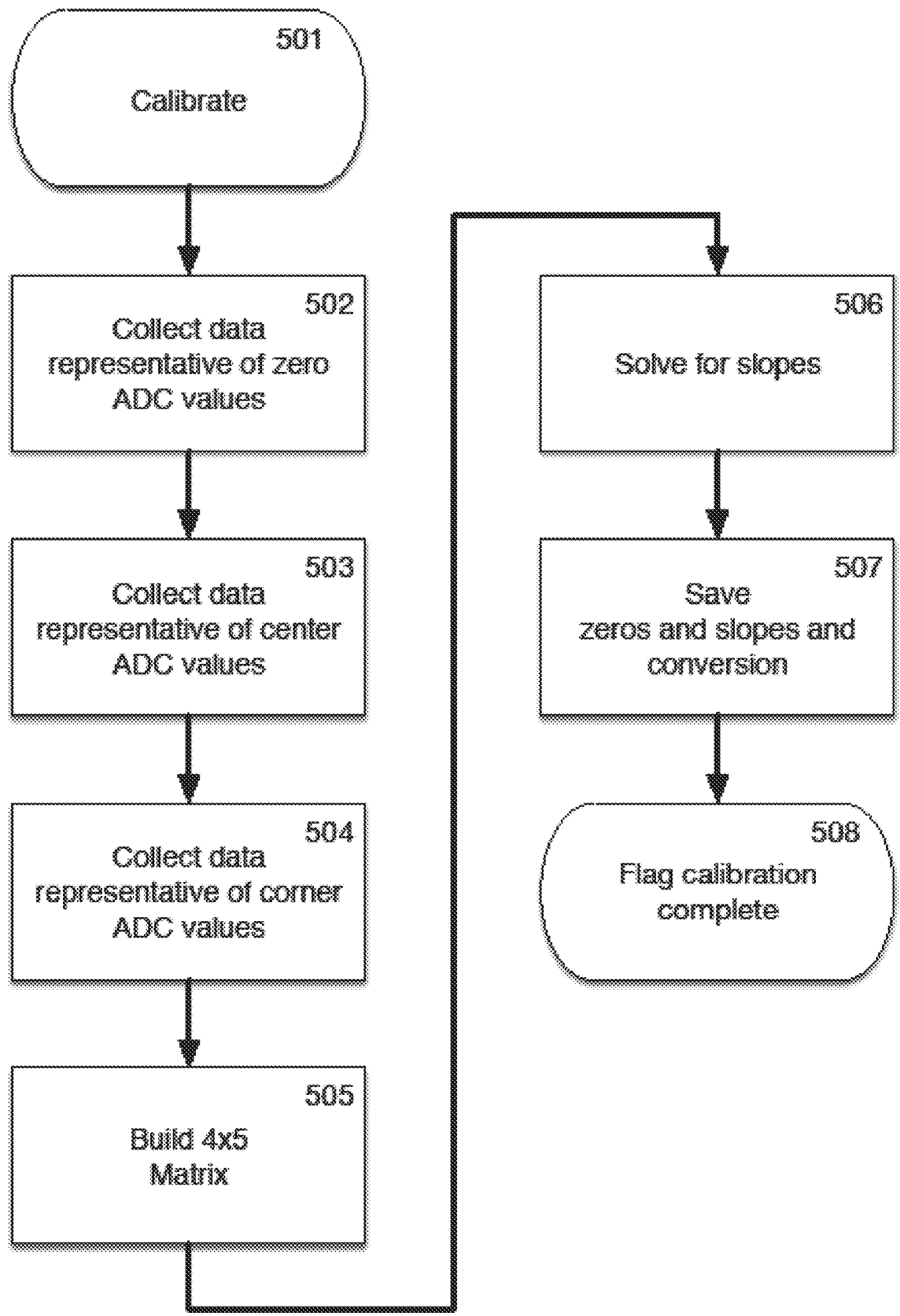
FIG. 5 is a flow chart of an example method illustrating the calibration in accordance with the present invention.

FIG. 5 is a flow chart of an example calibration process. At step 501, the calibration operation is initiated. At step 502, data from the ADC (103 in FIGS. 1 and 309 in FIG. 3) are collected representative of the voltage values coming from each of the load cells (a first load cell 314, a second load cell 315, a third load cell 316, and a fourth load cell 317). At step 503, data are collected from the ADC representing voltages produced by each load cell (a first load cell 314, a second load cell 315, a third load cell 316, and a fourth load cell 317), when the test weight or object to be weighed is placed in the center of the scale platform 201 (see FIG. 2). At step 504, values from the ADC are collected representing voltages from each load cell (a first load cell 314, a second load cell 315, a third load cell 316, and a fourth load cell 317) for each of the four corners of the scale platform 201 (see FIG. 2). At step 505, these corner and center values are used to create a 4 by 5 value matrix. At step 506, the matrix is then used to compute the slopes of each of the calibration transfer functions (examples illustrated in FIG. 4). At step 507, the calibration slopes computed at step 506 and the zeros determined at step 502 are saved for future use. At step 508, a software flag is created and raised to indicate to the system (e.g., the microcontroller 106 in FIG. 1/one or more scale-management processors 306) that the calibration process is complete.

Figure 6:
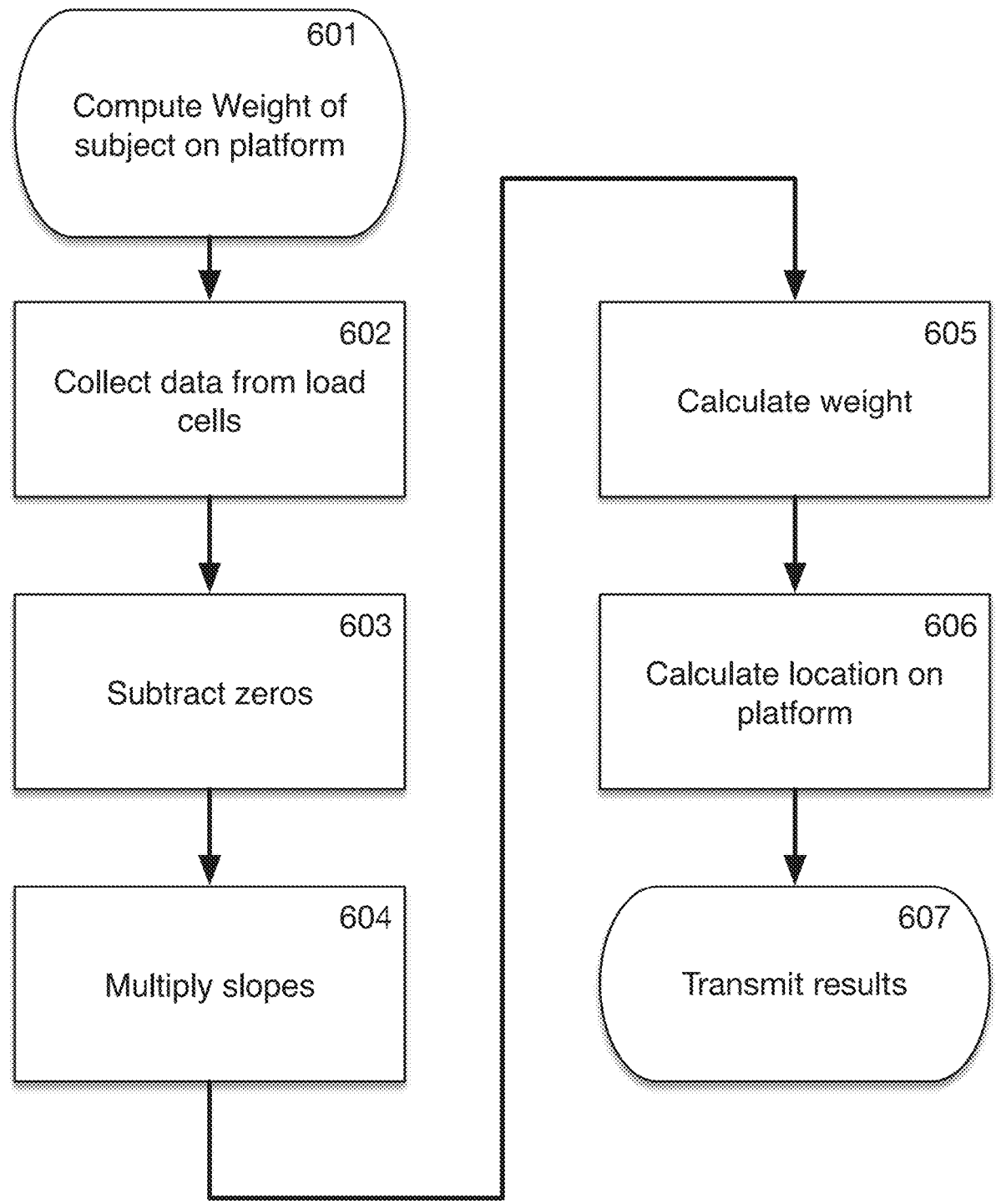
FIG. 6 is a flow chart of an example method describing use of calibration constants to compute an actual weight.

FIG. 6 is a flowchart describing the use of the calibration constants to compute an actual weight. At 601, the process begins with a trigger to start or initiate an operation to compute the weight of a physical object. At step 602, the values obtained by the ADC (104 in FIG. 1/309 in FIG. 3) are collected to represent voltage values from each of the load cells (a first load cell 314, a second load cell 315, a third load cell 316, and a fourth load cell 317). At step 603, the zero values collected at step 502 (in FIG. 5) are subtracted from the corresponding load cell values. At step 604, the slopes computed at step 506 (in FIG. 5) are multiplied by the corresponding values obtained from step 603. At step 605, these values are summed to compute a final weight. At step 606, the calibrated weight values obtained from each load cell are used to compute a location on the scale platform 201 (see FIG. 2). Finally, at step 607, the results are sent on to the logging processor 302 for storage.

One specific calibration technique to be used for the four load cells coupled on a rigid panel (e.g. scale platform) is described below. First, a user should see what each load cell generates for a zero or unloaded case. It is useful to sample and average load cell readings to average out some of the noise present in the system. The user should call these readings cellnPowerup where n is 0 to 3. These readings represent the y-intercept of the linear response line.

The next step is to place the known calibration weight at the central point of the scale panel or platform. In accordance with one embodiment, the system of the present invention can use a 1.000 kg weight. The next step is to calculate the difference between the reading in this configuration and the zero case for each load cell. These calculated values may be called CalLocCCellN where N is 0 to 3. Therefore, the algorithm is CalLocCCell0=cell0reading−cell0Powerup. This algorithm produces four values one for each load cell for the example where the calibration weight is placed in the center of the scale platform.

The next step is to move the calibration weight closer to load cell 0. In a similar operation, the difference between the reading in this configuration and the zero case for each load cell should be computed. These calculated values may be referred to as CalLoc0CellN where N is 0 to 3. The algorithm used is CalLoc0Cell0=cell0reading−cell0Powerup. Further CalLoc0Cell1=cell1reading−cell1Powerup. This produces four values one for each load cell for the example where the calibration weight is at load cell 0.

The next step is to move the calibration weight to near load cell 1. Similarly, the system algorithm calculates the difference between the reading in this configuration and the zero case for each load cell. The algorithm refers to these calculated values as CalLoc1CellN where N is 0 to 3. Therefore, the algorithm computes CalLoc1Cell0=cell0reading−cell0Powerup. Further CalLoc1Cell1=cell1reading−cell1Powerup. These computations provide four values one for each load cell for the case where the calibration weight is at load cell 1.

The next step is to move the calibration weight closer to load cell 2. Similarly, the system algorithms calculate the difference between the reading obtained in this configuration and the zero case for each load cell. These calculated values are called by the algorithm CalLoc2CellN where N is 0 to 3. Therefore, the algorithm for further calculations is CalLoc2CeLL0=cell0reading−cell0Powerup. Further, the algorithm step CalLoc2Cell1=cell1reading−cell1Powerup.

This gives us four values one for each load cell for the case where the calibration weight is at load cell 2.

The next step in the calibration process is to move the calibration weight near load cell 3. Similarly, the system algorithm calculates the difference between the reading in this configuration and the zero case for each load cell. These calculated values are CalLoc3CellN where N is 0 to 3. Therefore, CalLoc3Cell0=cell0reading−cell0Powerup. Further CalLoc3Cell1=cell1reading−cell1Powerup. These algorithms produce four values one for each load cell for the case where the calibration weight is at load cell 3. Further detail on an approach to compute the centroid of a mass of an object is described later with reference to FIGS. 7-9.

Each of these four reading at each of the load cells represents a linear equation. The equation is weight0*CalLocNCell0+weight1*CalLocNCell1+weight2*CalLocNCell2+weight3+CelLocNCell3=Calibration Weight. In one example determination in accordance with one embodiment of the present invention the Calibration Weight is 1.000 kg. The four unknowns weight0, weight1, weight2, and weight3 can be easily computed with as many equations as there are unknowns. In this example described here, as there are four sets of readings, there are four equations for the four unknowns.

$$(a_1-a_p)x+(b_1-b_p)y+(c_1-c_p)z+(d_1-d_p)q=w$$

$$(a_2-a_p)x+(b_2-b_p)y+(c_2-c_p)z+(d_2-d_p)q=w$$

$$(a_3-a_p)x+(b_3-b_p)y+(c_3-c_p)z+(d_3-d_p)q=w$$

$$(a_4-a_p)x+(b_4-b_p)y+(c_4-c_p)z+(d_4-d_p)q=w$$

Here, the $a_n$ values represent measurements made at load cell a with the test weight at location n, $a_p$ to compute the power up measurement of load cell a with no weight on it. The b, c, and d values are similar. The w value is the weight of the calibration weight.

Following the rules of Linear Algebra, four linear equations with four unknowns can be solved using a technique called Gaussian Elimination. The algorithm uses Gaussian Elimination to compute the four weightN values. These weightNs are the slopes of the respective linear response curves. By using these steps, the slopes of the linear response curves of the respective load cells are determined.

Finally, the conversion factor between the units of the analog-to-digital conversion of the load cells to units of mass may be determined, by using the equation for the center. SamplesPerKilo=(weight0*CalLocCCell0+weight1*CalLocCCell1+weight2*CalLocCCell2+weight3*CalLocCCell3)/Calibration Weight.

To use these values, the system computes the contribution from each load cell by subtracting the cellNPowerup value from the reading and multiplying by the weightN value. The total weight is given by summing these contributions and dividing by the SamplesPerKilo value. The different contributions from the different cells can be used to locate the centroid of the weight applied to the scale panel or platform.

Other calibration techniques may also be used. However, given the assumption of linearity, the above technique and algorithms result in an accurate and excellent calibration with a minimum of calibration readings required making this an effective and efficient process.

It is important to note that the readings are accomplished on the complete system. The load cells do not have to be separated from the measurement system to be calibrated. This is advantageous, as compared to prior systems, because each element has to be separately calibrated and characterized before assembly. This required contributions from all elements to be factored into the calibration process. This calibration technique involves fewer mechanical steps than prior approaches.

Also, it should be recognized that the exact location of the calibration readings is not critical. As long as there are four readings for four separate load cells, a user may obtain four equations that may be then solved for the four slopes. Separating the four readings as far as possible results in determining the most accurate slopes, but their exact placement is not critical. This approach works as long as a user has one center reading and one additional reading for each load cell—four in the example described above.

The general version of this method views each reading involving multiple sensors as a linear equation where the weighted linear sum adds to the calibration value. As many equations as sensors may be used to provide N linear equations with N unknowns. These N unknowns are the slopes of the linear transfer functions of the N sensors. It should be recognized that Gaussian Elimination is one example, other approaches may be used to solve this system of linear equations.

This calibration technique has helped create a unique and efficient measurement scale, which may be effectively used for weighing moving objects, for example animals as they move. With four load cells, large springs are not required to bring the weight to a single load cell. This makes the overall scale very thin, resilient, and very responsive to rapidly changing loads. The present measurement scale can effectively weigh penguins as they run across it. By avoiding the use of big springs, the measurement scale does not bounce as the penguins run across it. This simple calibration techniques make field calibration easy and field repair possible.

Figure 7A:
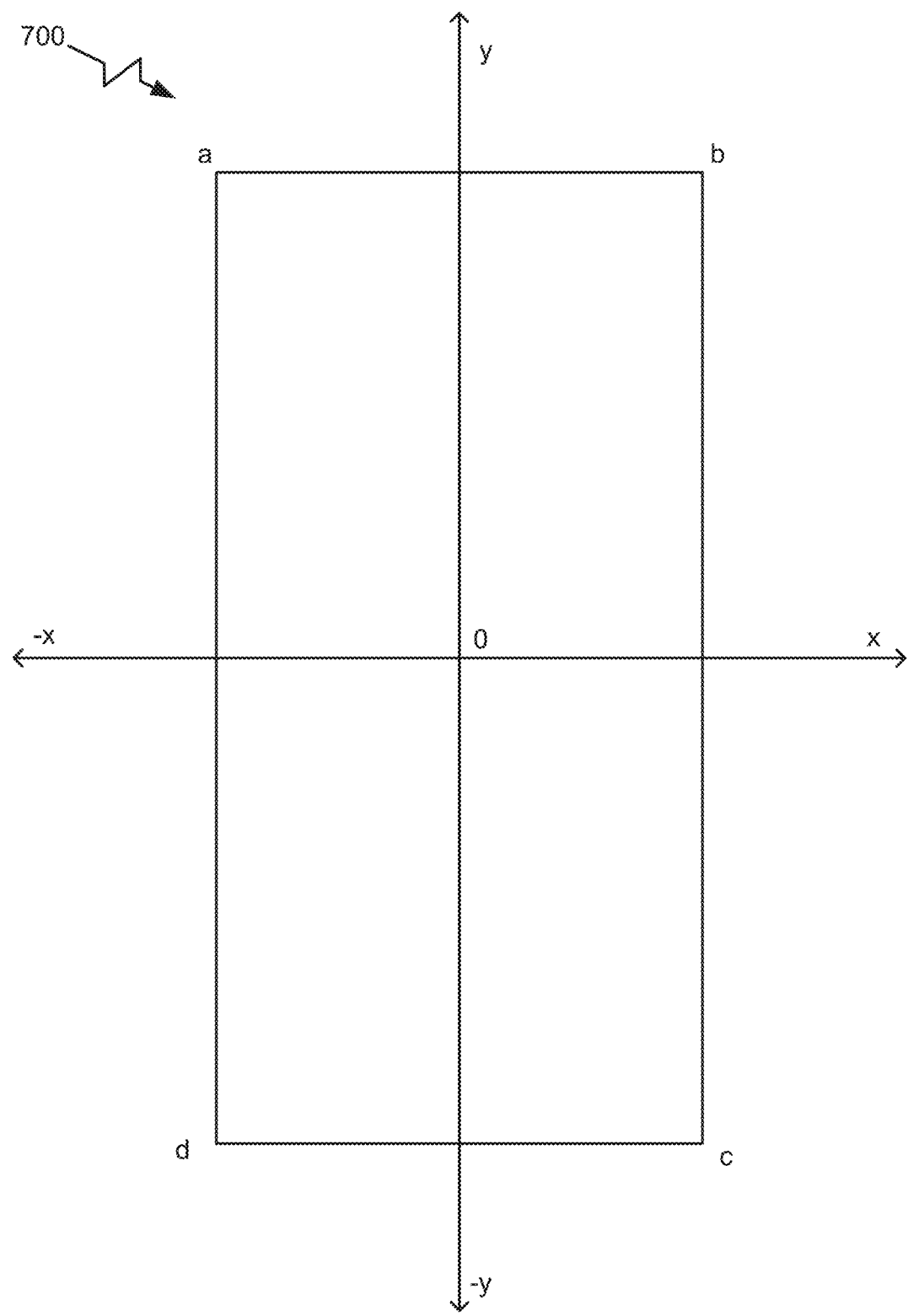
FIG. 7A is a graphic representation illustrating computation of a centroid of a mass of an example object on the calibration apparatus in accordance with the present invention.

Referring now to FIG. 7A, an example of how to compute the centroid of the mass of the object on the scale platform or calibration apparatus (a defined framework) is illustrated. The scale platform referenced by reference numeral 700 (101 in FIGS. 1 and 201 in FIG. 2) is depicted with "x" and "y" axes and an origin point "o" at the center of the scale platform 700. The scale platform is an example of a defined framework for fixed frame. The four corners where the sensors are located is designated by reference letters "a," "b," "c," and "d" in a clockwise configuration. The corner designated as "a" is in the quadrant bounded by a positive "y" axis and a negative "x" axis. Other configurations may be conformed to the shape of the scale platform 700 and used, depending upon the shape of the scale platform 700, dispersal of the sensors, and other engineering factors that will be appreciated by one skilled in this field of technology.

The measured values taken at each sensor are designated with their reference letter, for example "a," "b," "c," and "d." The measured sensor values when no object is on the scale platform 700 are designated by reference letters: "$a_p$," "$b_p$," "$c_p$," and "$d_p$." The computed calibration constants are designated as: "x," "y," "z," and "q" for "a," "b," "c," and "d," respectively. These calibration constants are calculated using the methods previously described.

The normalized sensor value at each sensor is computed by the following algorithms:

$$V_a=x(a-a_p),$$

$$V_b=y(b-b_p),$$

$$V_c=z(c-c_p),$$

$$V_d=q(d-d_p)$$

The total mass is the sum of the above algorithms:

$$V = V_a + V_b + V_c + V_d.$$

For certain embodiments and applications, it is also useful to compute the following values:

Total=$V$,

Top=$V_a + V_b$,

Bottom=$V_d + V_c$,

Left=$V_a + V_d$,

Right=$V_b + V_c$

From these computed values, the coordinates of the centroid of the mass are computed:

$y$=(Top/Total)−(Bottom/Total), $x$=(Right/Total)−(Left/Total).

In this illustrated example, a rectangular scale plate 700 with one sensor in each corner is used by way of example. Once the calibration constants have been computed with the technique disclosed, all the parameters required to compute the centroids are present. The centroids may be used for a number of applications. For example, the centroid may be used to track the progress of an object as it moves across the scale platform. In some embodiments the object may be live of a robot. In some instances, the object may be a ball rolling across the scale plate 700. In some embodiments, the object may be a live object, for example, an animal such as a penguin walking across the scale platform 700. This particular approach in accordance with the present invention may be used to estimate the stride length of the penguin. These techniques may also be used to distinguish bipeds from quadrupeds.

Figure 7B:
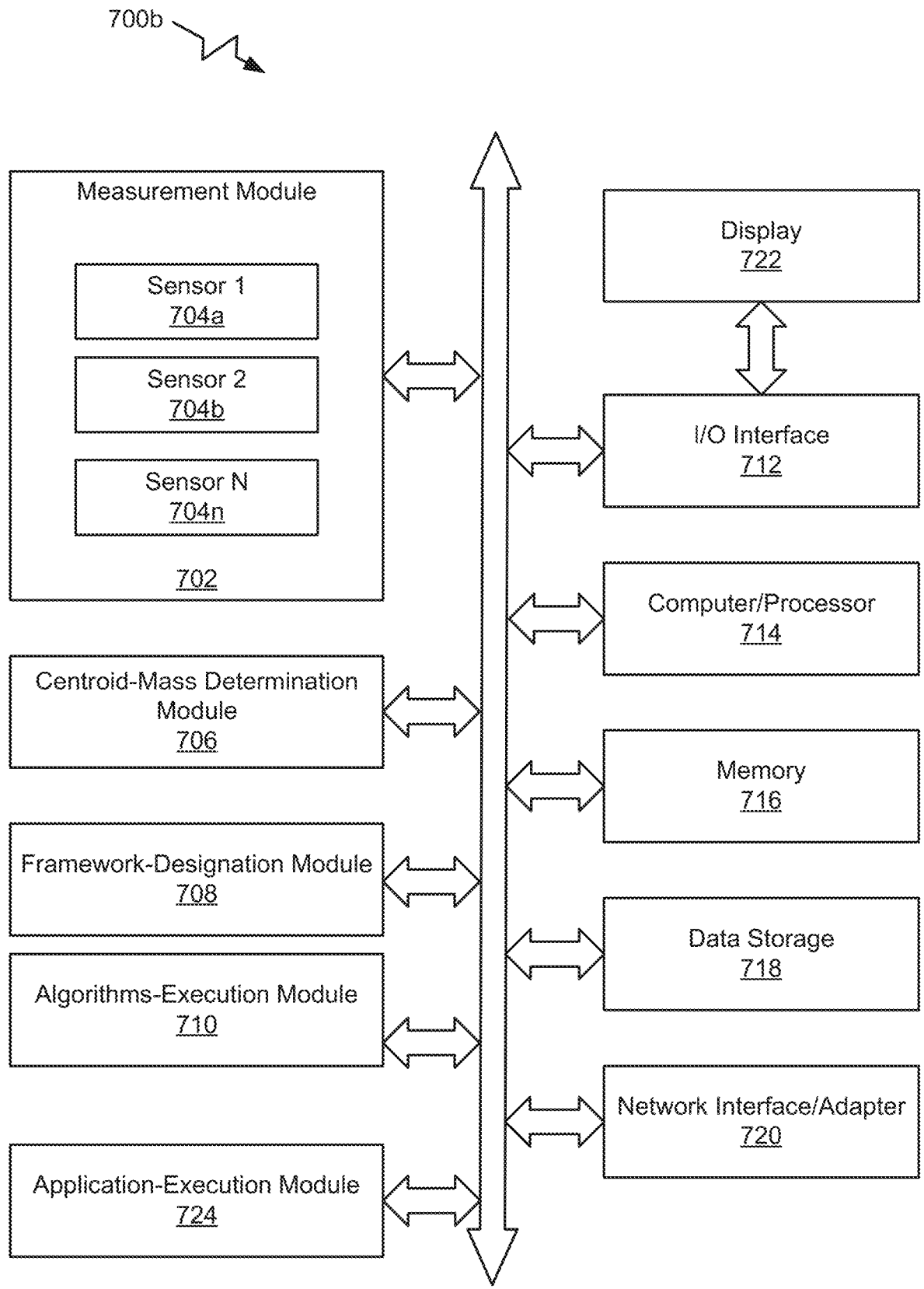
FIG. 7B is a block diagram of an example system architecture of hardware and software components for executing the algorithms.

Referring now to FIG. 7B, the hardware and software components that perform the operations and execute algorithms is described. FIG. 7B illustrates the scale platform 700 including various modules and components illustrated collectively and referenced by reference numeral 700b here. The system 700b comprises a measurement module 702, a centroid-mass determination module 706, a framework-designation module 708, and an algorithms-execution module 710.

The measurement module 702 is a precision platform with software or a program with computer instructions stored in an executable file to execute functions by a computer that provide sensor measurements in a defined space. The executable file may be linked to static or dynamic-linked libraries. The measurement module 702 utilizes any of the sensors described above to operate as described above and to measure. In one embodiment, the sensors may measure robotic movements. It should be recognized by those skilled in the art that a robot's "working envelope" is its range of movement or the space within which it can reach. It is the shape created when a robot reaches forward, backward, up and down. These distances are determined by the length of a robot's arm and the design of its axes. Each axis contributes its own range of motion. The sensors may serve as conversion devices that transform microwave echo signals into electrical signals. They may use wireless sensing technology to detect motion by figuring out the robot's position, shape, motion characteristics, and motion trajectory.

The centroid-mass determination module 706 acquires measurement data from the measurement module 702. It should be recognized by those skilled in the art, that the number of sensors illustrated are by way of example. More sensors may be used to gather more data if desired and for different circumstances. The centroid-mass determination module 706 performs computation functions with respect to the object.

The framework-designation module 708 in some embodiments may be used for different configurations of the scale platform 700. The algorithms-execution module 710 executes the various algorithms defined here.

The various modules and components illustrated collectively and referenced by reference numeral 700b in addition include other hardware components that perform the functions described. The other components of the system 700b includes a computer/process 714 coupled by a bus to an input/output (I/O) interface 712, which is coupled to a memory 716, a data storage 718, and a network adapter 720.

The present technology also relates to an apparatus for performing the operations described. This apparatus may be specially constructed as described above for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Components of the present technology can take the form of an entirely hardware embodiment, an entirely software embodiment or an implementation containing both hardware and software elements. In some implementations, this technology is implemented in software, which includes but is not limited to, firmware, resident software, microcode, etc. Furthermore, this technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer or data processing system 714 is suitable for storing and/or executing program or executable code includes at least one processor coupled directly or indirectly to memory elements through the system bus. The memory elements can include local memory 716 employed during actual execution of the program code, bulk storage, and cache memories, which provide temporary storage of at least some program code in order to reduce the number of times, code must be retrieved from bulk storage (data storage 718) during execution. Input/output or I/O devices (including but not limited to, keyboards, displays, pointing devices, etc.) can be coupled to the system either directly or through intervening I/O controllers.

Network adapters 720 are illustrated coupled to the system to enable the data processing system 714 to become coupled to other data processing systems or remote printers or storage devices through intervening private or public networks. Modems, cable modem, and Ethernet cards are just a few of the currently available types of network adapters. For example, the network adaptor may be a network interface module coupled to a network by a signal line and a bus as illustrated. The network interface module may include ports for wired connectivity such as but not limited to USB, SD, or CAT-5, etc. The network interface module may link the processor 714 to a network that may in turn be coupled to other processing systems. The network may comprise a local area network (LAN), a wide area network (WAN) (e.g., the Internet), and/or any other interconnected data path across which multiple devices may communicate. The network interface module may provide other conventional connections to the network using standard network protocols such as TCP/IP, HTTP, HTTPS and SMTP as will be understood to those skilled in the art. In other embodiments, the network interface module may include a transceiver for sending and receiving signals using WIFI, Bluetooth® or cellular communications for wireless communication.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

Each computer 714 in the system may include one or more input and output (I/O) unit 712, a memory system 716, and one or more processing units. The "I/O" units of each computer 714 may be connected to various input/output devices 712, such as a mouse, keyboard, video card (video monitor), sound card (with speakers), network card, and printer. The memory system 716 in a typical general purpose computer system usually includes a computer readable and writeable nonvolatile recording medium, of which a magnetic disk, a flash memory and tape are examples. The memory system 718 operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

The computer/processor 714 processes data signals and program instructions received from the memory 716. For example, the processor 714 may comprise an arithmetic logic unit, a microprocessor, a general-purpose controller or some other processor array programmed in accordance with the present invention to perform computations and provide electronic display signals to the display 722. The processor 714 is coupled to the bus for communication with the other components. Processor 714 processes data signals and may comprise various computing architectures including a complex instruction set computer (CISC) architecture, a reduced instruction set computer (RISC) architecture, or an architecture implementing a combination of instruction sets. Although only a single processor is shown in FIG. 7B, multiple processors may be included. It will be obvious to one skilled in the art that other processors, operating systems, sensors, displays and physical configurations are possible.

The memory 716 is non-transitory storage medium. The memory 716 stores the instructions and/or data which may be executed by the computer/processor 714. In some embodiments, the instructions and/or data stored on the memory 704 comprises code for performing any and/or all of the techniques described herein. The memory 704 may be a dynamic random-access memory (DRAM) device, a static random-access memory (SRAM) device, flash memory or some other memory device known in the art. The memory 716 may store a web browser with the JavaScript for conducting any functions that require access to remote networks or libraries. In some embodiments, the cache memory 716 is coupled to the processor 714. The cache memory 216 is a random-access memory (RAM) that the processor 714 may access more quickly than it can access regular RAM. This cache memory 216 is typically integrated directly with the processor chip or may be on a separate chip that has a separate bus interconnect with the processor 714. The cache memory 716 is used to reduce the average time to access data from the main memory or data storage 718. The cache is a smaller and faster memory, which stores the program instructions that are frequently referenced by the software during operation. Fast access to these instructions increases the overall speed of the software program. In operation, as the processor 714 processes data, it looks first in the cache memory 716 for instructions and if it finds the instructions there (from a previous reading of the data), it does not conduct a more time-consuming reading of data from the larger memory or other data storage devices 718. In some instances, multi-tier or multilevel caching, with different levels providing greater efficiency may also be used.

The network adapter 720 facilitates the communication between the software servers via a network for remote processing or linking with other remote systems.

The display device 722 serves to display any information or control functions desired at the charging station. For example, the display 722 may be used to display a graphical illustration of a relative orientation of the truck with respect to the three-dimensional planes.

Figure 8:
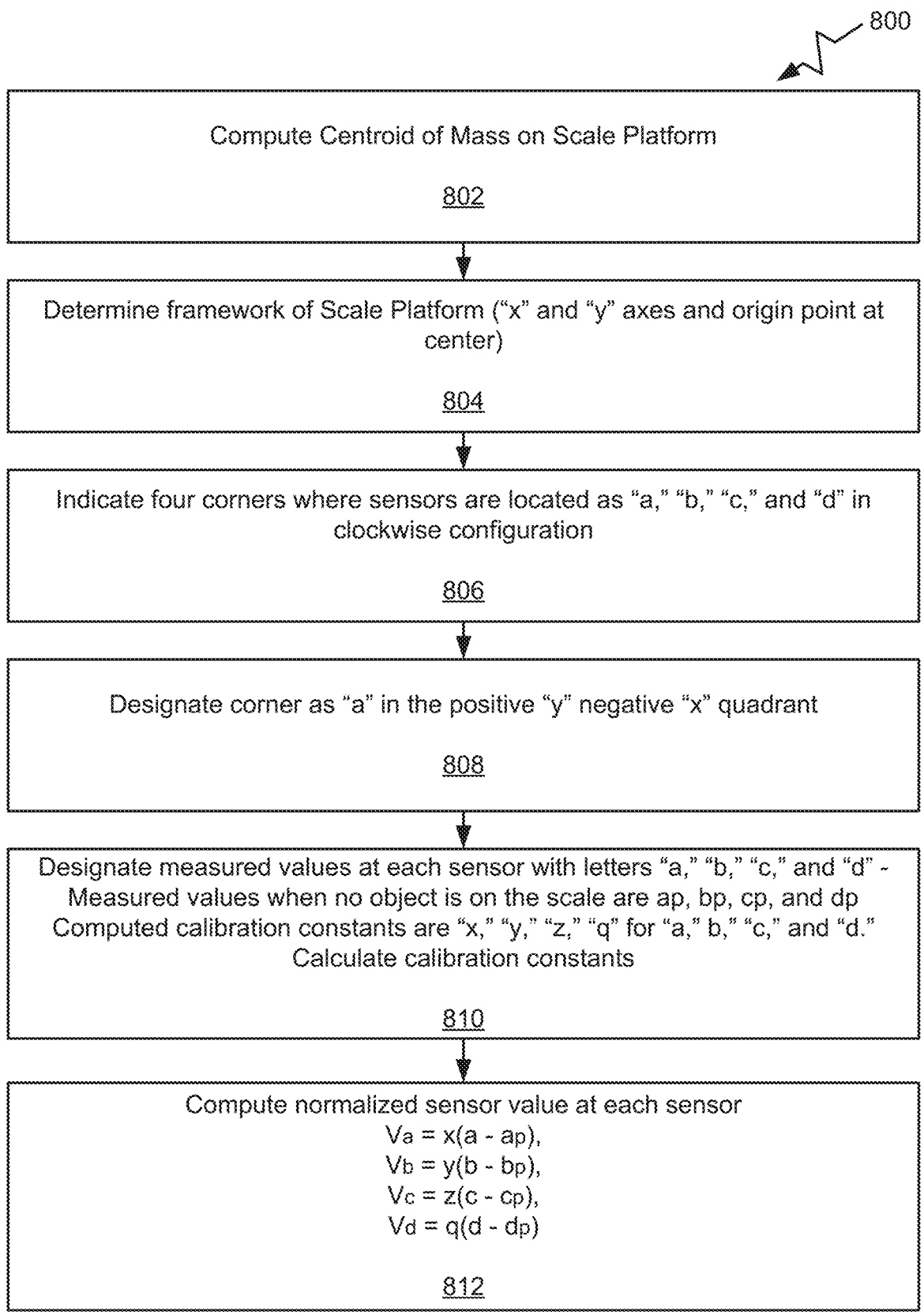
FIG. 8 is a flow chart illustrating an example method of computing the centroid of the mass of an example object.
Figure 9:
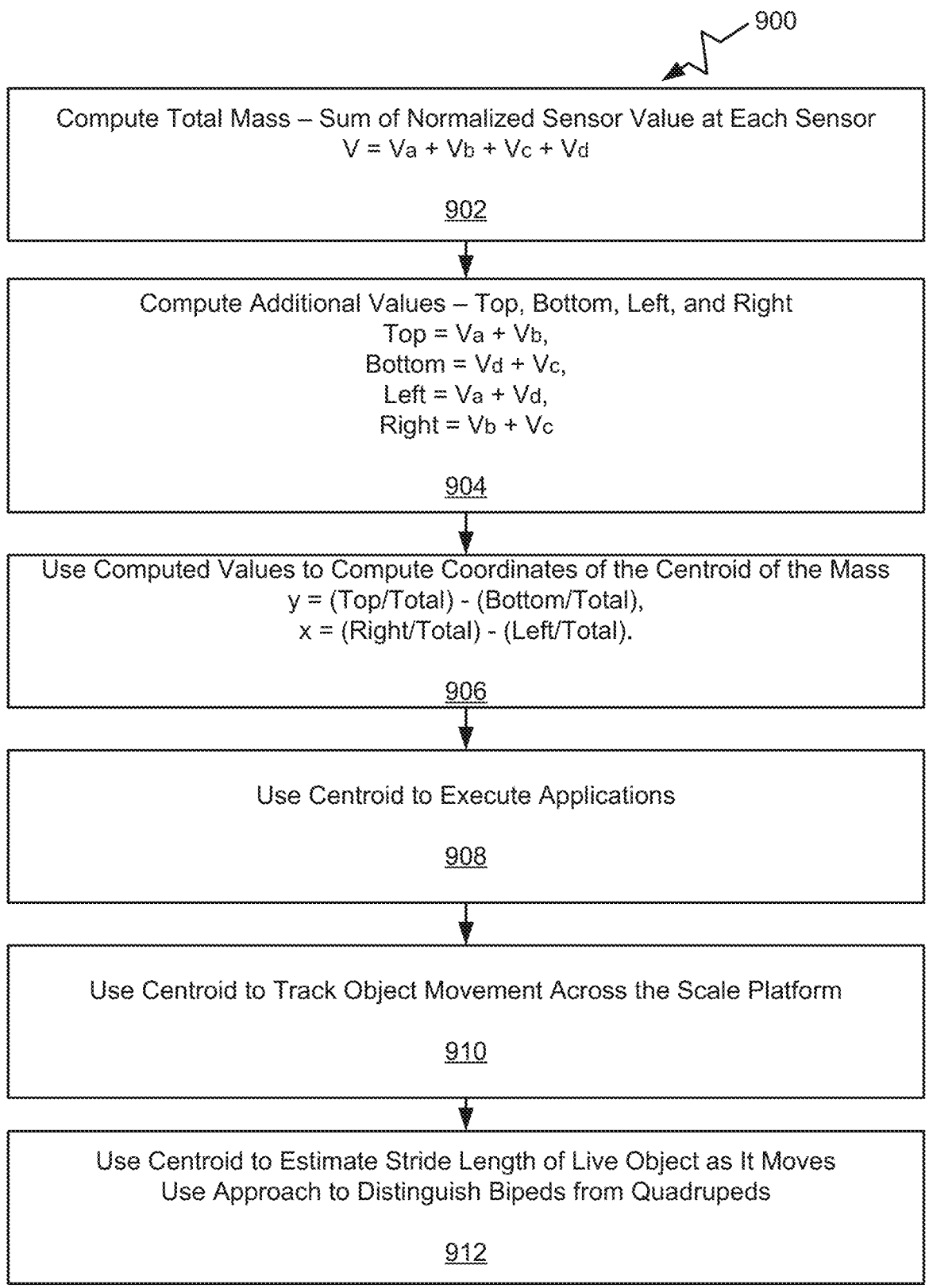
FIG. 9 is a flow chart illustrating continuation of the example method of computing the centroid of the mass, which method may be easily executed in different applications.

A capability to compute such movements as strides across the scale platform 700 is a unique advantage of a multi-sensor approach to measuring weight. Referring now to FIGS. 8 and 9, an approach to compute the centroid and use it to execute application is described. Referring to FIG. 8, the process 800 begins at block 802 including one or more operations that compute the centroid of the mass of an object placed on the scale platform 700 (FIG. 7). The process 800 continues to the next block 804 including one or more operations that determine the framework of the scale platform 700 ("x" and "y" axes and origin point "o" at the center. The process 800 proceeds to the next block 806 including one or more operations that indicate or designate four corners where the sensors are located as "a," "b," "c," and "d," in clockwise configuration. The process 800 proceeds to block 808 including one or more operations that designate corner "a" in the positive "y" and negative "x" quadrant. The process 800 continues to the next block 810 including one or more operations for designating measured values at each sensor with letters "a," "b," "c" and "d." The measured values when no object is on the scale may be designated by reference letters "ap," "bp," "cp," and "dp." The process 800 designates computed calibration constants as "x," "y," "z," and "q" for "a," "b," "c," and "d," respectively. The process 800 calculates the calibration constants.

The process 800 proceeds to the next block 812 including one or more operations that compute a normalized sensor value at each sensor by using the following algorithms:

$$V_a = x(a - a_p),$$

$$V_b = y(b - b_p),$$

$$V_c = z(c - c_p),$$

$$V_d = q(d - d_p).$$

The process 800 continues as process 900 as illustrated in FIG. 9. The process 900 begins at block 902 including one or more operations that compute the total mass, by computing the sum of the normalized sensor values at each sensor. The algorithm to execute this computation is set forth below:

$$V = V_a + V_b + V_c + V_d.$$

The process 900 proceeds to the next block 904 including one or more operations for computing additional values. In some embodiments, the process 900 computes additional values at the top, bottom, left, and right. For certain embodiments and applications, it may be useful to compute the following values:

$$\text{Total} = V,$$

$$\text{Top} = V_a + V_b,$$

$$\text{Bottom} = V_d + V_c,$$

$$\text{Left} = V_a + V_d,$$

$$\text{Right} = V_b + V_c.$$

The process 900 proceeds to the next block 906 including one or more operations that use computed values to compute coordinates of the centroid of the mass. From these computed values, the coordinates of the centroid of the mass may be computed, by using the following algorithms:

$$y = (\text{Top}/\text{Total}) - (\text{Bottom}/\text{Total}),$$

$$x = (\text{Right}/\text{Total}) - (\text{Left}/\text{Total}).$$

The process 900 proceeds to the next block 908 including one or more operations for using the centroid to execute applications. The applications are diverse. In some embodiments, the centroid may be used to track object movement across the scale platform 700. The process 900 proceeds to the next block 910 including one or more operations that uses the centroid to track object movement across the scale platform 700. The process 900 proceeds to the next block 912 including one or more operations that use the centroid to estimate the stride length of a moving object, whether live or manufactured to simulate human movement, for example a robot. The process 900, at block 912 may include operations that use the approach described here to distinguish between bipeds and quadrupeds. In the illustrated examples, a rectangular scale plate 700 with one sensor in each corner is used by way of example.

It should be recognized that once the calibration constants have been computed with the technique disclosed, all the parameters required to compute the centroids are present. The centroids may be used for a number of applications. For example, the centroid may be used to track the progress of an object as it moves across the scale platform as described above. In some embodiments the object may be live or a robot. In some instances, the object may be a ball rolling across the scale plate 700. In some embodiments, the object may be a live object, for example, an animal such as a penguin walking across the scale platform 700. This particular approach in accordance with the present invention may be used to estimate the stride length of the penguin. Alternatively, it may be used to compute the stride length of a robot's movement. These techniques may also be used to distinguish bipeds from quadrupeds, examples of which may be live animals or robots. The algorithms used represent a finite sequence of steps for solving a logical or mathematical problem or performing a task.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a controller, or similar electronic computing device, that manipulates and transforms data represented as physical (electronic) quantities within the controller's registers and memories into other data similarly represented as physical quantities within the controller memories or registers or other such information storage, transmission or display devices.

The disclosed technologies also relate to an apparatus for performing the operations herein. This apparatus may be specially constructed for the required purposes, or it may include a general-purpose computing element selectively activated or reconfigured by computer instructions stored in the computing element. Such computer instructions may be stored in a computer readable storage medium, for example, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing or data processing component suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the calibration apparatus or device either directly or through intervening I/O controllers.

Network adapters may also be coupled to the calibration apparatus or device to enable it to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose components may be used with programs in accordance with the teachings herein to substitute for the more specialized apparatus of the present invention to perform the required method steps. The required structure to create a variety of these systems appears in the description above. In addition, the disclosed technologies are not described with reference to any particular programming language. It will be appreciated that a variety of programming languages may be used to implement any portion of the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system, comprising:
a measurement module comprising a plurality of sensors positioned at predetermined locations on a platform with an object to be measured, each of the plurality of sensors configured to provide an output signal representing a sensor reading representing a first physical characteristic of a physical property of the object, the measurement module by a combined transfer function providing a cumulative measurement signal that represents the measurement of the physical property of the object; and
a mass-determination module configured to compute a centroid of the object by executing one or more algorithms to execute one or more applications.

2. A system according to claim 1, wherein the one or more applications include an application to track movement of the object across a platform with a defined framework.

3. A system according to claim 1, wherein a defined framework is determined based on x-y axes and an origin point in a center of the defined framework.

4. A system according to claim 3, wherein in one configuration, the plurality of sensors includes at least four sensors positioned at four corners to the defined framework.

5. A system according to claim 4, wherein a first corner is designated in a positive y and negative x quadrant.

6. A system according to claim 5, where algorithms are executed to determine measured values at each sensor with and without the object and to compute normalized sensor values at each sensor.

7. A system according to claim 6, wherein an algorithm computes a total mass of the object based on a sum of normalized sensor values at each sensor.

8. A system according to claim 7, wherein an algorithm computes additional values at a top, bottom, left, and right.

9. A system according to claim 1, wherein the centroid is used to track object movement across a defined framework.

10. A system according to claim 1, wherein the centroid is used to estimate a stride length of the object.

11. A method, comprising:
positioning a measurement module comprising a plurality of sensors at predetermined locations on a platform bearing an object to be measured, each of the plurality of sensors configured to provide an output signal representing a sensor reading representing a first physical characteristic of a physical property of the object, the measurement module by a combined transfer function providing a cumulative measurement signal that represents the measurement of the physical property of the object; and
using a mass-determination module configured to compute a centroid of the object by executing one or more algorithms to execute one or more applications.

12. A method according to claim 11, wherein the one or more applications include an application to track movement of the object across a platform with a defined framework.

13. A method according to claim 12, wherein the defined framework is determined based on x-y axes and an origin point in a center of the defined framework.

14. A method according to claim 13, wherein in one configuration, the plurality of sensors includes at least four sensors positioned at four corners to the defined framework.

15. A method according to claim 14, wherein a first corner is designated in a positive y and negative x quadrant.

16. A method according to claim 15, where algorithms are executed to determine measured values at each sensor with and without the object and to compute normalized sensor values at each sensor.

17. A method according to claim 16, wherein one of the algorithms computes a total mass of the object based on a sum of normalized sensor values at each sensor.

18. A method according to claim 17, wherein one of the algorithms computes additional values at a top, bottom, left, and right.

19. A method according to claim 13, wherein the centroid is used to track object movement across the defined framework.

20. A method according to claim 11, wherein the centroid is used to estimate a stride length of the object.

* * * * *